United States Patent [19]

Groth et al.

[11] 4,350,257
[45] Sep. 21, 1982

[54] KIT FOR ASSEMBLING TOOLBOX ADAPTED FOR INSTALLATION IN BACK OF PICKUP TRUCK AND METHOD OF ASSEMBLING THE TOOLBOX

[75] Inventors: Hugh F. Groth, Brecksville; L. Scot Duncan, Northfield, both of Ohio

[73] Assignee: Delta, Inc., Jonesburg, Ark.

[21] Appl. No.: 224,841

[22] Filed: Jan. 13, 1981

[51] Int. Cl.³ .......................... B65D 6/12; B65D 6/16
[52] U.S. Cl. .................................... 220/4 F; 206/577; 220/315; 312/257 SM; 29/462; 29/526R
[58] Field of Search ................ 220/4 F, 315; 206/577, 206/600; 312/257 SM; 296/37.1; 29/411, 462, 521, 526 R

[56] References Cited

U.S. PATENT DOCUMENTS

| | | | |
|---|---|---|---|
| 3,687,325 | 8/1972 | Simons | 220/4 F |
| 3,692,204 | 9/1972 | Provi et al. | 220/4 F |
| 3,887,101 | 6/1975 | Adachi | 220/4 F |
| 4,231,453 | 11/1980 | Minor | 220/4 F |

*Primary Examiner*—Joseph Man-Fu Moy
*Attorney, Agent, or Firm*—Finnegan, Henderson, Farabow, Garrett & Dunner

[57] ABSTRACT

A kit for assembling a toolbox adapted for installation in the back of a pickup truck, the kit containing: a preassembled upper section, an unassembled lower section, and fasteners for fastening the upper section to the lower section, when assembled. The interrelatable parts of the unassembled lower section include: a bottom panel, a pair of end panels, a pair of side panels, and four locking members. The end and side panels carry tabs for interconnecting with corresponding slots on the bottom panel. Adjacent side edges of the end and side panels have abutting locking channels which are slidingly interlocked by the locking members.

10 Claims, 3 Drawing Figures

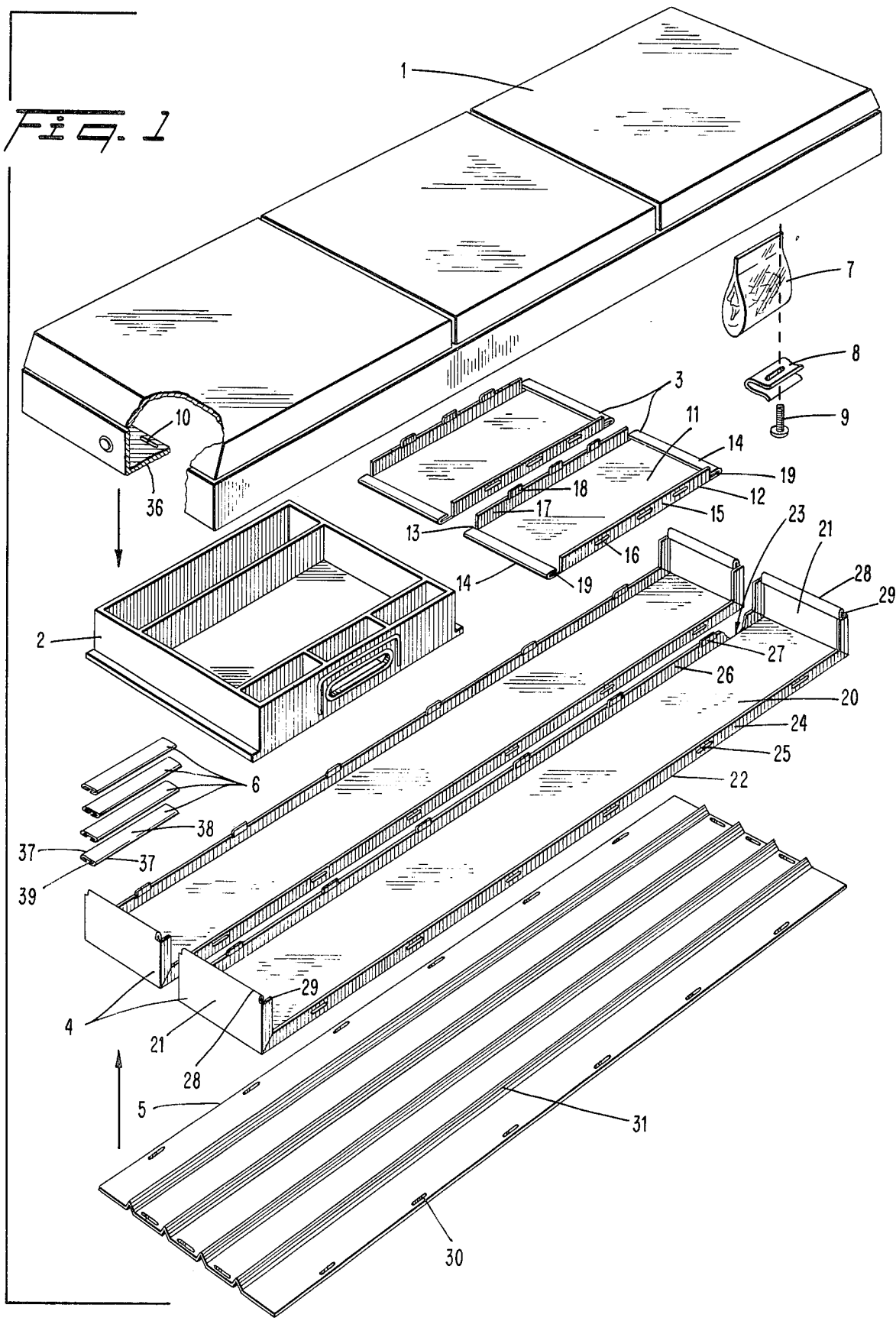

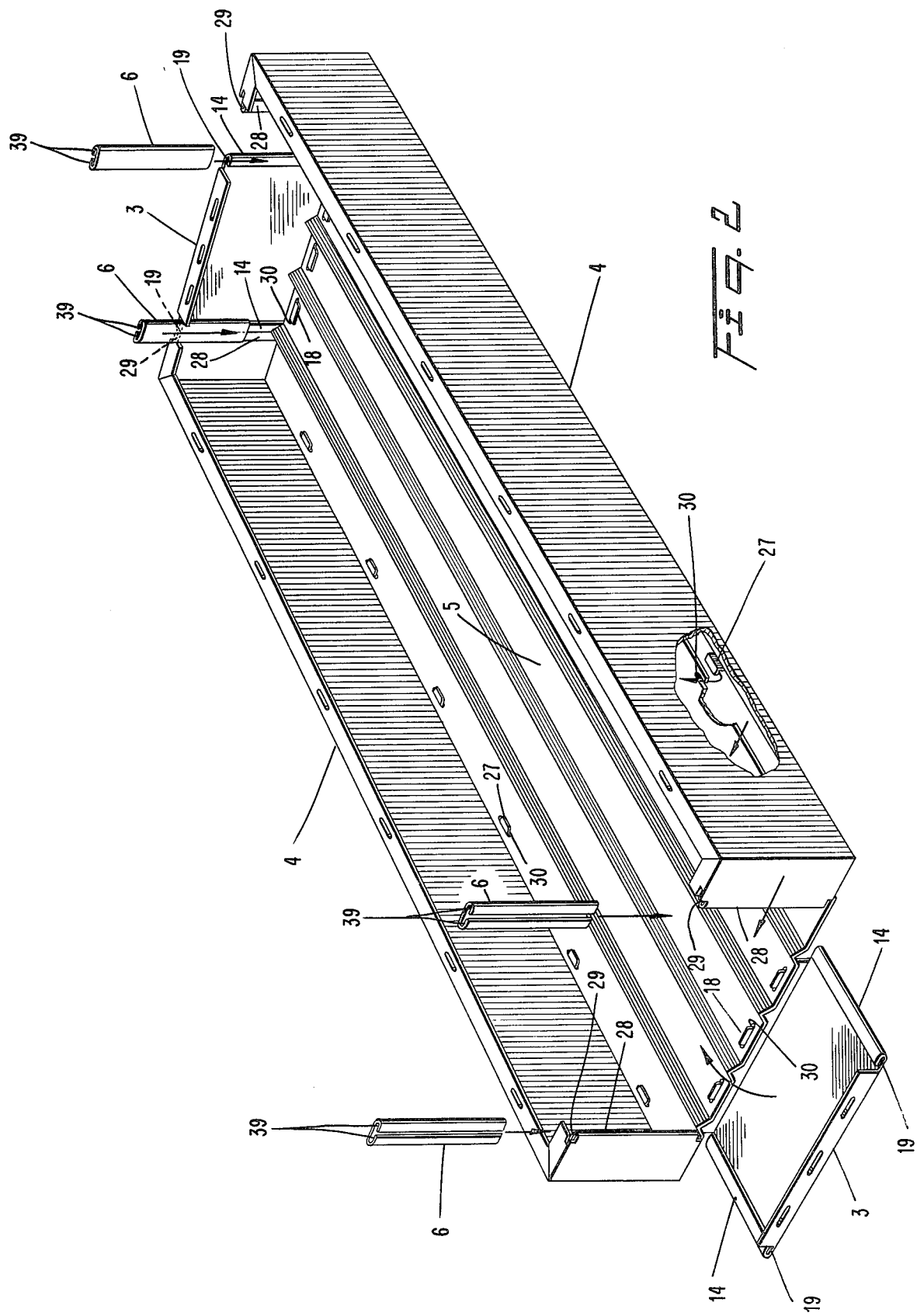

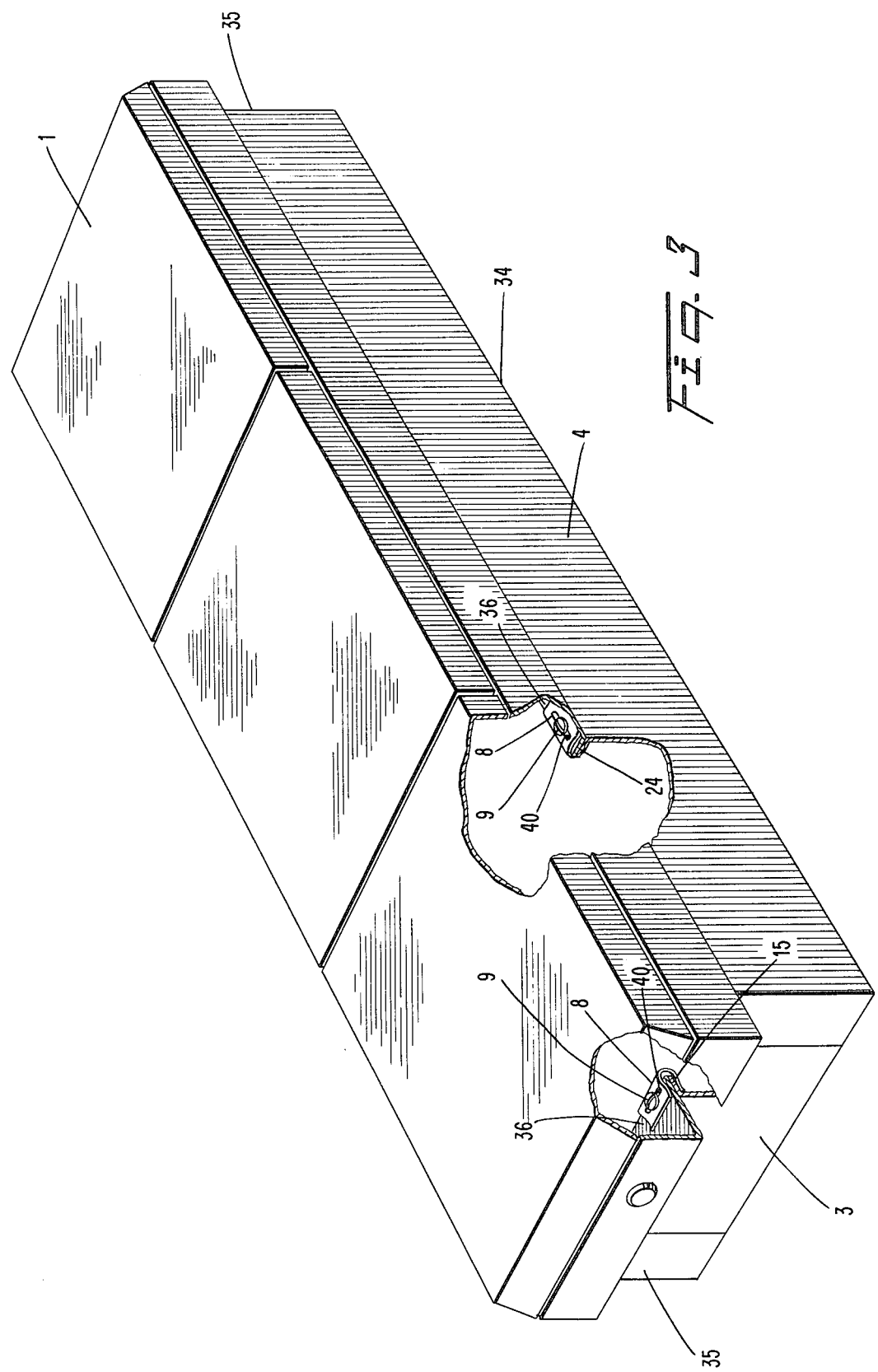

KIT FOR ASSEMBLING TOOLBOX ADAPTED FOR INSTALLATION IN BACK OF PICKUP TRUCK AND METHOD OF ASSEMBLING THE TOOLBOX

BACKGROUND OF THE INVENTION

The present invention relates to a kit for assembling a toolbox, adapted for installation in the back of a pickup truck, and a method of assembling the toolbox.

Toolboxes adapted for installation in the back of a pickup truck are known in the art. For example, reference may be made to U.S. Patent to Parker et al., U.S. Pat. No. 3,640,423, issued Feb. 8, 1972, for "Toolbox For Pickup Truck." This patent discloses a toolbox for mounting across the bed of a pickup truck. Both ends of the toolbox are L-shaped, thereby allowing the toolbox to extend transversely across the back of the truck, with the ends of the box being supported by the upper edges of the sidewalls of the truck.

One disadvantage with prior art toolboxes of this sort, however, is that they are not knockdownable. That is, they are not composed of simple, easily-assembled component parts, that can be shipped and sold in the form of a kit, which can be assembled later by an untrained and unskilled purchaser.

Knockdownability is a very desirable feature for toolboxes of this sort. Because of their size, transportation costs represent a significant cost in their production. If toolboxes of this sort were knockdownable, and transported in kit form, shipping costs could be reduced substantially, thereby reducing the overall cost of marketing the toolboxes.

Knockdownability, however, is a difficult feature to incorporate into toolboxes of this sort. Because the toolboxes are to be installed on the back of a pickup truck, the devices for joining the elements of the kit together must be sturdy enough to be able to withstand the stresses generated by the pickup truck. At the same time, however, the toolboxes must be constructed such that they can be easily assembled by an untrained and unskilled purchaser. These requirements dictate the use of unique devices for joining the elements of the kit together, that is, the joining devices must combine the characteristics of both strength and simplicity.

SUMMARY OF THE INVENTION

It is, therefore, a main object of the present invention to provide a kit for assembling a toolbox adapted for installation in the back of a pickup truck, and a method of assembling the toolbox, which overcomes the above-mentioned drawbacks and problems.

It is a more specific object of the present invention to provide a kit for assembling a toolbox adapted for installation in the back of a pickup truck, and a method of assembling the toolbox, wherein the devices for joining the elements of the kit together are both sturdy enough to be able to withstand the stresses generated by the pickup truck, and simple enough that the kit can be easily assembled by an untrained and unskilled purchaser.

A still further object of this invention is to provide a kit for assembling a toolbox adapted for installation in the back of a pickup truck, and a method of assembling the toolbox, wherein the devices for joining the elements of the kit are hidden from view in the finished article, and the resulting toolbox is pleasing to look at.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects, and in accordance with the purpose of the invention, as embodied and broadly described herein, a kit for assembling a toolbox having upper and lower sections, the toolbox being adapted to extend transversely across the back of a pickup truck, with the lower section fitting snugly within the bed of the truck, and the upper section being supported at each end by the upper edges of the sidewalls of the truck, comprises: a lower section substantially rectangular bottom panel, having a row of slots adjacent each edge of the panel; a pair of lower section end panels, each having tab means on one edge for interconnecting with corresponding slots of the lower section bottom panel, and side locking channel means on opposite edges perpendicular to the one edge; a pair of lower section side panels of the same height as the end panels, each having tab means on one edge for interconnecting with corresponding slots of the lower section bottom panel, a main body portion, relatively narrow opposite side portions bent 90° from the main body portion, the side portions having outer edges, and the outer edges having side channel means thereon, each of the side channel means to abut a corresponding one of the side locking channel means of the end panel, when assembled; four integral locking means for slidingly interlocking with corresponding side channel means on abutting edges of the lower section end panels and side panels to interconnect adjacent lower section end panels and side panels during assembly; a pre-assembled upper section; and means for fastening the pre-assembled upper section to the lower section, when assembled.

To further achieve the objects, and in accordance with the purpose of the invention, as embodied and broadly described herein, a method of assembling a toolbox, having upper and lower sections, the toolbox being adapted to extend transversely across the back of a pickup truck, with the lower section fitting snugly within the bed of the truck, and the upper section being supported at each end by the upper edges of the sidewalls of the truck, comprises: providing a pre-assembled upper section; forming a lower section bottom panel of shorter length than, and equal width to, the upper section; fabricating a pair of lower section end panels of shorter width than the width of the bottom panel; turning the opposite side edges of the end panels back upon the panels to form opposing open locking channels; fabricating a pair of lower section side panels of greater length than the bottom panel, and height equal to the end panels; bending like portions of each end of the side panels inwardly 90° to form a main body portion and two side portions, the main body portions being the same length as the bottom panel and the combined widths of corresponding side portions of the pair of side panels and an end panel being substantially equal to the width of the bottom panel; turning the outer edges of the side portions of the side panels back upon the side portions to form open locking channels, the locking channels to abut corresponding ones of the locking channels of the opposite side edges of the end panels, when assembled; forming four locking members of planar sheets of a length equal to the height of the end panels and side panels, and a width greater than the combined depths of abutting locking channels of an end panel and a side portion of a side panel by turning the edges of the planar sheets back upon the sheets to form a body portion and a pair of opposed front open locking channels, the width of the body portion of the locking members being slightly greater than the combined depths of abutting locking channels of an end panel and a side portion of a side panel; interlocking the pair of end panels and the pair of side panels with the bottom panel by tabs on the end and side panels and slots in the bottom panel, while simultaneously positioning the opposing open locking channels on the end panels and the open locking channels on the side portion of the side panels so that they abut, and are perpendicular to the bottom panel; securing the abutting locking channels of the end panels and the side portions of the side panels together by sliding the opposed front open locking channels of the locking members individually over abutting locking channels of the end panels and the side portions of the side panels, thus assembling the lower sections; and fastening the lower section to the pre-assembled upper section with fastening means.

The foregoing and other objects, features, and advantages of the present invention will be made more apparent from the following description of the preferred embodiments. The accompanying drawings, which are incorporated in and constitute a part of this specification, illustrate the preferred embodiment of the invention, and, together with the description serve to explain the principles of the invention.

BRIEF DESCRIPTION OF THE DRAWINGS

FIG. 1 is an exploded, perspective view of the preferred embodiment of the invention, illustrating in partial cut-away form the component parts of the kit.

FIG. 2 is a perspective view, illustrating in partial cut-away form the preferred method of assembling the lower section of the toolbox from the component parts of the kit of FIG. 1.

FIG. 3 is a perspective view, in partial cut-away form, illustrating the preferred method of attaching an assembled lower section to the pre-assembled upper section of the toolbox of FIG. 1.

DESCRIPTION OF THE PREFERRED EMBODIMENT

Reference will now be made in detail to the present preferred embodiment of the invention, an example of which is illustrated in the accompanying drawings.

In accordance with the invention, as embodied herein, with reference now to FIG. 1, the kit in general comprises: a pre-assembled upper section (1); a pre-assembled storage tray (2), which fits within the upper section; a pair of lower section end panels (3); a pair of lower section side panels (4); a lower section bottom panel (5); four lower section box channels (6); and a hardware bag (7) containing clips (8) and screws (9).

In accordance with this invention, the pre-assembled upper section includes means for fastening the pre-assembled upper section to the lower section, when assembled. As embodied herein, the pre-assembled upper section (1) has an inturned flange (36) on its lower side and a plurality of apertures (10) adjacent the periphery of the flange for attaching the upper section to a lower section, when assembled, by means of the clips (8) and screws (9) as described with respect to FIG. 3.

The lower section bottom panel (5) is substantially rectangular, and has a length shorter than, and a width equal to that of, the pre-assembled upper section (1). The lower section bottom panel (5) has a row of slots (30) adjacent each edge of the panel. The lower section bottom panel (5) also has a plurality of parallel deformable ridges (31) running along the length of the panel to strengthen the panel.

The two lower section end panels (3) are identical, and are of shorter width than the width of the bottom panel (5). Each lower section end panel has a planar body portion (11), a top edge (12), a bottom edge (13) and a pair of side edges (14). In accordance with this invention, each lower section end panel includes means for fastening the pre-assembled upper section to the lower section, when assembled. As embodied herein, the top edge (12) has an inturned top flange (15) extending perpendicular to the body portion (11), and the top flange has a plurality of apertures (16) therein, matching respective apertures (10) in the pre-assembled upper section (1), for attaching the upper section (1) to the lower section, when assembled, by means of the clips (8) and screws (9), as described with respect to FIG. 3.

In accordance with this invention, each lower section end panel has tab means on one edge for interconnecting with corresponding slots of the lower section bottom panel. As embodied herein, the bottom edge (13) has an inturned bottom flange (17) extending perpendicular to the body portion (11), and the bottom flange has a plurality of offset, step-shaped tabs (18) outstanding at its outer edge for interconnecting with corresponding slots (30) of said lower section bottom panel (5).

In accordance with this invention, each lower section end panel also has side channel means on opposite edges perpendicular to the tab-carrying edge. As embodied herein, the two side edges (14) are identical, each folded back upon the body portion (11) to form a pair of locking channels (19). Preferably, the locking channels are open, and all of the channels are on the inside of the toolbox, when assembled, as is illustrated in FIG. 2.

The two lower section side panels (4) are identical, and are of greater total length than the bottom panel (5) and height equal to the end panels (3). Each lower section side panel has a planar main body portion (20), relatively narrow opposite side portions (21) turned inwardly 90° to form corners, a top edge (22) and a bottom edge (23). The body portion (20) is the same length internally as the bottom panel (5). The combined widths of corresponding side portions (21) of the pair of side panels (4) and an end panel (3) are substantially equal to the width of the bottom panel (5).

In accordance with this invention, each lower section side panel has means for fastening the pre-assembled upper section to the lower section, when assembled. As embodied herein, the top edge (22) has an inturned top flange (24) extending perpendicular to the body portion 20, and the top flange (24) has a plurality of apertures (25) therein, matching respective apertures (10) in the pre-assembled upper section (1), for attaching the upper section to the lower section, when assembled, by means of the clips (8) and screws (9) as described further with respect to FIG. 3.

In accordance with this invention, each lower section side panel has tab means on one edge for interconnecting with corresponding slots of the lower section bottom panel. As embodied herein, the bottom edge (23) has an inturned bottom flange (26) extending perpendicular to the body portion (20), and the bottom flange (26)

has a plurality of offset step-shaped tabs (27) outstanding at its outer edge for interconnecting with corresponding slots (30) of the lower section bottom panel (5). The two side portions (21) on each side panel (4) are identical, each having outer edges (28).

In accordance with this invention, each outer edge of a side portion of a side panel has side channel means thereon, each of said channel means to abut a corresponding one of the channel means of the end panel, when the lower section is assembled. As embodied herein, the outer edges (28) are folded back on the side portions (21), to form a pair of locking channels (29). Preferably, the locking channels are open, and all of the channels are on the inside of the toolbox, when assembled, as is illustrated in FIG. 2. The width of the side portions (21) of the side panels (4) and the width of the end panels (3) are dimensioned, so that adjacent locking channels of adjacent side and end panels abut when the lower section is assembled, as is illustrated in FIG. 2.

In accordance with this invention, the kit includes four integral locking means for slidingly interlocking with corresponding side channel means on abutting edges of the lower section end panels and side panels to interconnect adjacent lower section end panels and side panels, during assembly. As embodied herein, the four lateral locking means are identical box channels (6), each box channel being a rectangular planar sheet, the opposite side edges (37) of which have been folded back upon the sheet so as to form a body portion (38) and a pair of opposed front open locking channels (39). The length of the box channel (6) is equal to the height of the lower section, i.e., the height of the end panels (3) and side panels (4), and the width of the box channel (6) is greater than the combined depths of abutting locking channels (19, 29) of the end panel (3) and the side panel (4), the width of the body portion (38) of the box channel being slightly greater than the combined depths of abutting locking channels (19, 29) of the end panel (3) and the side panel (4).

With additional reference now to FIGS. 2 and 3, the kit is assembled by first inserting the tabs (18, 27) of the end panel (3) and side panels (4) into the slots (30) of the bottom panel (5), in order to secure the end panels (3) and the side panels (4) to the bottom panel (5). Next, the end panels (3) and the side panels (4) are rotated to a position perpendicular to the bottom panel (5) using the stepped portions of the tabs (18, 27) as pivot points. At this step of the assembly, the locking channels (19, 29) on adjacent edges (14, 28) of adjacent end panels (3) and side panels (4) abut. The individual box channels (6) are then slid into engagement, their locking channels (39) mating with the abutting locking channels (19, 29) of the end panels (3) and the side panels (4), thereby securing the end panels (3) and the side panels (4) together. Next, the assembled lower section (34) is attached to the upper section (1) by means of resilient clips (8) and screws (9). The clips (8) clamp the inturned flange (36) on the lower side of the pre-assembled upper section to the inturned top flanges (15, 24) of the end panels (3) and the side panels (4). Each clip has an aperture (40), which is alignable with aperture (10) in the inturned flange (36) of the lower side of the pre-assembled upper section and one of apertures (16, 25) in the inturned top flange (15, 24) of an end panel (3) or a side panel (4). The assembled lower section (34) is secured to the upper section (1) by clamping the complementary inturned flanges (36, and 15, 24) together, and inserting the screws (9) through the aligned apertures (40, 10, and 16, 25). Last of all, the pre-assembled storage tray (2) is inserted into the pre-assembled upper section (1).

The pre-assembled upper section is longer than the lower section, when assembled, thus providing L-shaped ends (35) to the toolbox for engaging the sidewalls of the back of a pickup truck. In other words, when in use the toolbox extends transversely across the back of the pickup truck, with the lower section (34) fitting snugly within the bed of the truck, and the upper section (1) being supported at each end by the upper edges of the sidewalls of the truck.

Although the present invention has been described by reference to a preferred embodiment thereof, it should be understood that various changes and modifications may be made without departing from the spirit and scope of the invention. It is intended that the present invention cover such modifications and variations of this invention that come within the scope of the claims and their equivalents.

What is claimed is:

1. A kit for assembling a toolbox having upper and lower sections, said toolbox being adapted to extend transversely across the back of a pickup truck, with said lower section fitting snugly within the bed of the truck, and said upper section being supported at each end by the upper edges of the sidewalls of the truck, comprising:

a lower section substantially rectangular bottom panel, having a row of slots adjacent each edge of said panel;

a pair of lower section end panels, each having tab means on one edge for interconnecting with corresponding slots of said lower section bottom panel, and side channel means on opposite edges perpendicular to said one edge;

a pair of lower section side panels of the same height as said end panels, each having tab means on one edge for interconnecting with corresponding slots of said lower section bottom panel, a main body portion, relatively narrow opposite side portions bent 90° from the main body portion, said side portions having outer edges, and said outer edges having side channel means thereon, each of said side channel means to abut a corresponding one of said side channel means of said end panel, when assembled;

four integral locking means for individually slidingly interlocking abutting side channel means of said end panels and side panels;

a pre-assembled upper section; and means for fastening said pre-assembled upper section to said lower section, when assembled.

2. A kit according to claim 1 wherein each of said side channel means of said end panels and side panels comprises an edge of said individual panel folded back upon said panel to form an open channel, all said channels being on the inside of said toolbox, when assembled, and each of said locking means comprises a rectangular planar sheet, the length of said sheet being equal to said height of said end panels and side panels, opposite side edges of said sheet being folded back upon said sheet to form opposing open locking channels.

3. A kit for assembling a toolbox having upper and lower sections, said toolbox being adapted to extend transversely across the back of a pickup truck, with said lower section fitting snugly within the bed of the truck, and said upper section being supported at each end by the upper edges of the sidewalls of the truck, comprising:
- a lower section substantially rectangular bottom panel, having a row of slots adjacent to each edge of the panel;
- a pair of lower section end panels, each of said end panels having a planar body portion with bottom and side edges, said bottom edge having a bottom flange extending perpendicular to said body portion, said bottom flange having offset, step-shaped tabs outstanding on its outer edge for interconnecting with corresponding slots of said lower section bottom panel, and each of said side edges folded back upon said body portions to form an open locking channel;
- a pair of lower section side panels, each of said side panels having a planar body portion, narrow side portions turned inwardly 90° to form corners, and a bottom edge, said bottom edge having a bottom flange extending perpendicular to said body portion, said bottom flange of each side panel having offset, step-shaped tabs outstanding on its outer edge for interconnecting with corresponding slots of said lower section bottom panel, each of said side portions having an outer edge folded back upon said side portion to form an open locking channel, the width of said side portions of said side panels and the width of said end panels being dimensioned so that adjacent locking channels on adjacent side and end panels abut when said lower section of said toolbox is assembled;
- four box channels, each of said box channels comprising a rectangular sheet having side edges folded back upon the sheet to form a pair of opposed open locking channels for slidingly interlocking with corresponding locking channels of said lower section end and side panels to interconnect adjacent lower section end and side panels, the length of each of said box channels being equal to the height of said end and side panels;
- a pre-assembled upper section; and
- means for fastening said pre-assembled upper section to said lower section, when assembled.

4. A kit according to claim 3, wherein said means for fastening said pre-assembled upper section to said lower section, when assembled, comprises complementary inturned flanges on the lower side of said pre-assembled upper section and the top edges of said end and side panels, matching apertures in said complementary inturned flanges, resilient clips for clamping said complementary inturned flanges together, said clips having apertures for alignment with said matching apertures, and bolts or screws for inserting through said aligned apertures and securing said clips and complementary flanges together.

5. A kit according to claim 3, which also includes a tray which fits within said pre-assembled upper section of said toolbox.

6. A kit according to claim 3, wherein said lower section bottom panel has one or more ridges running the length of said panel to strengthen said panel.

7. A method of assembling a toolbox, having upper and lower sections, said toolbox being adapted to extend transversely across the back of a pickup truck, with said lower section fitting snugly within the bed of the truck, and said upper section being supported at each end by the upper edges of the sidewalls of the truck, the method comprising:
- providing a pre-assembled upper section;
- forming a lower section bottom panel of shorter length than, and equal width to, said upper section;
- fabricating a pair of lower section end panels of shorter width than said width of said bottom panel;
- turning the opposite side edges of said end panels back upon said end panels to form opposing open locking channels;
- fabricating a pair of lower section side panels of greater length than said bottom panel, and height equal to said end panels;
- bending like portions of each end of said side panels inwardly 90° to form a main body portion and two side portions, said main body portion being the same length as said bottom panel, and the combined widths of corresponding side portions of said pair of side panels and an end panel being substantially equal to said width of the bottom panel;
- turning outer edges of said side portions of said side panels back upon said side portions to form open locking channels, said locking channels to abut corresponding ones of said locking channels on said opposite side edges of said end panels, when assembled;
- forming four locking members of planar sheets of a length equal to said height of said end panels and side panels, and a width greater than the combined depths of abutting locking channels of said end panel and said side portion of said side panel, by turning edges of said planar sheets back upon said sheets to form a body portion and a pair of opposed front open locking channels the width of said body portion of said locking members being slightly greater than said combined depths of abutting locking channels of said end panel and said side portion of a side panel;
- interlocking said pair of end panels and said pair of side panels with said bottom panel by tabs on said end and side panels and slots in said bottom panel, while simultaneously positioning said opposing open locking channels on said end panels and said open locking channels on said side portions of said side panels so that they abut, and are perpendicular to said bottom panel;
- securing said abutting locking channels of said end panels and said side portions of side panels together by sliding said opposed front open locking channels of said locking members individually over abutting locking channels of said end panels and said side portions of said side panels, thus assembling said lower section; and
- fastening said lower section to said pre-assembled upper section.

8. The method as claimed in claim 7 wherein said tabs are step-shaped, and said opposing open locking channels on said end panels and said open locking channels on said side portion of said side panels are positioned side-by-side by rotating said end and side panels about said stepped portions of said tabs to positions perpendicular to said bottom panel.

9. The method as claimed in claim 7 wherein fastening said lower section to said pre-assembled upper section includes the steps of: clamping complementary inturned flanges on the lower side of said pre-assembled upper section and the upper edges of said end and side panels together with clips, said complementary inturned flanges and said clips having alignable apertures therein, and inserting bolts or screws through said aligned apertures.

10. The method as claimed in claim 7, which also includes the step of inserting a tray into said upper section of said toolbox.

* * * * *